(12) United States Patent
Ito

(10) Patent No.: US 7,611,436 B2
(45) Date of Patent: Nov. 3, 2009

(54) ANGULAR POSITION ADJUSTING MECHANISM

(75) Inventor: Sadao Ito, Aichi (JP)

(73) Assignee: Aisin Seiki Kabushiki Kaisha, Kariya-Shi (JP)

( * ) Notice: Subject to any disclaimer, the term of this patent is extended or adjusted under 35 U.S.C. 154(b) by 363 days.

(21) Appl. No.: 10/571,259

(22) PCT Filed: Sep. 9, 2004

(86) PCT No.: PCT/JP2004/013489

§ 371 (c)(1),
(2), (4) Date: Mar. 9, 2006

(87) PCT Pub. No.: WO2005/025930

PCT Pub. Date: Mar. 24, 2005

(65) Prior Publication Data

US 2007/0032332 A1    Feb. 8, 2007

(30) Foreign Application Priority Data

Sep. 10, 2003 (JP) .............................. 2003-318622
Feb. 17, 2004 (JP) .............................. 2004-040358
Feb. 17, 2004 (JP) .............................. 2004-040359

(51) Int. Cl.
*F16H 3/70* (2006.01)
*F16H 1/32* (2006.01)
*F16H 55/08* (2006.01)
*F16H 55/10* (2006.01)
*B60N 2/02* (2006.01)
*B60N 2/48* (2006.01)

(52) U.S. Cl. ......................... 475/180; 475/170; 74/457; 297/362

(58) Field of Classification Search ................. 475/169, 475/170, 180; 74/457; 297/362
See application file for complete search history.

(56) References Cited

U.S. PATENT DOCUMENTS

| 3,165,943 | A |  | 1/1965 | Sundt |  |
|---|---|---|---|---|---|
| 4,302,047 | A | * | 11/1981 | Esser | 297/362 |
| 4,570,510 | A |  | 2/1986 | Babak |  |
| 4,922,781 | A |  | 5/1990 | Peiji |  |
| 5,484,345 | A | * | 1/1996 | Fukaya | 475/162 |
| 5,695,425 | A | * | 12/1997 | Hashimoto et al. | 475/180 |
| 5,707,310 | A |  | 1/1998 | Maeguchi et al. |  |

(Continued)

FOREIGN PATENT DOCUMENTS

DE    101 57 851 A1    6/2003

(Continued)

OTHER PUBLICATIONS

Official Action issued by the Japanese Patent Office on Feb. 13, 2007 in corresponding Japanese Patent Application No. JP 2004-040358, and partial English-language translation thereof.

(Continued)

*Primary Examiner*—Tisha D Lewis
(74) *Attorney, Agent, or Firm*—Buchanan Ingersoll & Rooney PC

(57) ABSTRACT

In an angular position adjusting apparatus, tooth profiles of an internal gear 31 and an external gear 21 are formed according to loop shapes 74a and 84a of predetermined trochoid curves 74 and 84.

19 Claims, 6 Drawing Sheets

U.S. PATENT DOCUMENTS

| | | | |
|---|---|---|---|
| 5,755,491 | A | 5/1998 | Baloche et al. |
| 6,168,235 | B1 * | 1/2001 | Freund .................. 297/362 |
| 6,230,587 | B1 * | 5/2001 | Grill ..................... 74/640 |
| 6,578,921 | B2 | 6/2003 | Koga et al. |
| 6,814,406 | B2 | 11/2004 | Ito et al. |
| 7,322,654 | B2 * | 1/2008 | Kawashima ............ 297/362 |

FOREIGN PATENT DOCUMENTS

| | | |
|---|---|---|
| FR | 1349898 | 12/1963 |
| GB | 1 372 808 | 11/1974 |
| GB | 2 132 261 A | 7/1984 |
| GB | 2 250 190 A | 6/1992 |
| JP | 55-68328 | 5/1980 |
| JP | 59-140936 A | 8/1984 |
| JP | 61-252935 A | 11/1986 |
| JP | 02-224704 A | 9/1990 |
| JP | 05-092733 A | 4/1993 |
| JP | 7-79740 B2 | 8/1995 |
| JP | 7-243486 A | 9/1995 |
| JP | 9-313285 A | 12/1997 |
| JP | 2002-065388 | 3/2002 |
| JP | 2002-119352 A | 4/2002 |
| JP | 2003-237433 A | 8/2003 |
| KR | 1999-15665 A | 3/1999 |

OTHER PUBLICATIONS

Official Action issued by the Japanese Patent Office in corresponding JP Application No. 2003-318622, Jun. 12, 2007; and English-language translation thereof.

Official Action (Notice to Submit Response), issued by the Korean Intellectual Property Office in corresponding KR Patent Application No. 10-2006-7004993, May 31, 2007; and English translation thereof.

Official Action issued by the Japanese Patent Office in corresponding JP Patent Application No. 2004-040358, Jun. 19, 2007; and English translation thereof.

Japanese Official Action and English language translation of Japanese Official Action.

* cited by examiner

PRIOR ART

ANGULAR POSITION ADJUSTING MECHANISM

TECHNICAL FIELD

The present invention relates to an angular position adjusting mechanism, which is employed as a mechanism for steplessly adjusting the angular position of a seat back of a vehicular seat or the height position of a seat cushion thereof and which needs strength in an angular position holding state thereof.

BACKGROUND ART

As shown in FIG. 7, such an angular position adjusting mechanism enabled to steplessly adjust the position is configured by forming an internal gear 231 in one of brackets and also forming an external gear 221 in the other bracket so that the internal gear 231 is meshed with the external gear 221, and that these gears are mutually rotatably combined with each other, to thereby enable the adjustment of the angular position and also enable the brackets to firmly hold the position.

As shown in FIG. 3, the tooth profiles employed by these gears are formed according to a cycloid curve 274, which is the locus of a basic point 271 on the circumference of the rolling circle 80, by setting, for example, a fixed circle 71 and a rolling circle 80, which rotates while internally touching the fixed circle 71. That is, the tooth profile of the external gear 221 is set like a circular-arc centered at the position of the basic point 271 shown in FIG. 7, while the tooth profile of the internal gear 231 is formed in such a way as to have tooth flanks 275 formed at an equidistance A from a predetermined cycloid curve 274 (see JP-A-55-068328).

Incidentally, as will be described later, in a case where the fixed circle 71 and the rolling circle 80 have a relation similar to that in the aforementioned case, and where the basic point is set at a place, which is not on the circumference of the rolling circle, the locus of the basic point is called a trochoid curve that is distinguished from the cycloid curve.

DISCLOSURE OF INVENTION

Similarly to the aforementioned background art, the mesh between the external gear 221, which has a circular-arc-like tooth profile, and the internal gear 231, which has a tooth profile formed according to the cycloid curve, is such that the internal gear abuts against the external gear at each of many meshing points M. Thus, a large meshing ratio is obtained. However, the inclination D (see FIG. 7) of the tooth flank F to a surface E (see FIG. 7), which is perpendicular to the direction of rotation of the external gear, is large, so that a large load is liable to act upon the gear. Therefore, the background art is disadvantageous in ensuring meshing strength.

Accordingly, a technical problem to be solved by the invention is to obtain an angular position adjusting mechanism using an internal gear and an external gear, which have tooth profiles that provides higher meshing strength.

(1) According to one configuration of the invention, there is provided a technical configuration in which the tooth profiles of the internal gear and the external gear are formed according to the loop shapes of a predetermined trochoid curve.

(2) Preferably, the tooth profiles of the internal gear and the external gear are adapted so that tooth flanks, each of which is at a constant distance from an associated one of the loop shapes, are formed.

(3) Preferably, the tooth profiles of the internal gear and the external gear are adapted so that tooth flanks, each of which is away in a direction of rotation of a constant angle from an associated one of the loop shapes, are formed.

(4) Preferably, at least one of the tooth profiles of the internal gear and the external gear has a relief flank portion, which differs from the loop shapes of the predetermined trochoid curves, and a gap is formed between each bottom land of the internal gear and an associated top land of the external gear in a state in which the internal gear meshes with the external gear.

(5) Preferably, the tooth profile of the external gear is adapted so that the tooth flanks are formed according to the loop shapes of the predetermined trochoid curve. The top lands are formed in such a way as to have flat shapes, and a curved surface is applied to a corner portion serving as a boundary between each tooth flank and an associated one of the top lands thereof.

(6) Preferably, each relief flank portion for forming a gap between each bottom land of the internal gear and an associated one of the top lands is formed of an associated one of the top lands and an associated one of the corner portions.

(7) Preferably, the tooth profile of the internal gear is adapted so that each of the bottom lands is formed of a curved surface.

(8) Preferably, the tooth profile of the internal gear is adapted so that the tooth flanks are formed according to the loop shapes of the predetermined trochoid curve. The top lands are formed in such a way as to have flat shapes. A curved surface is applied to a corner portion serving as a boundary between each tooth flank and an associated one of the top lands thereof.

(9) Preferably, each relief flank portion for forming a gap between each bottom land of the internal gear and an associated one of the top lands is formed of an associated one of the top lands and an associated one of the corner portions.

(10) Preferably, the tooth profile of the internal gear is adapted so that each of the bottom lands is formed of a curved surface.

(11) Preferably, the angular position adjusting apparatus further includes a shaft rotatably supported in the fixed bracket. The internal gear is formed around the shaft in the fixed bracket. The external gear is formed around the shaft in the rotating bracket, and the number of teeth of the external gear is smaller than that of teeth of the internal gear by at least one.

(12) Preferably, the internal gear is formed in a bore part of a concave portion formed by pushing the fixed bracket thereinto in a direction of thickness thereof. The external gear is formed in an outside diameter part of a convex portion formed by pushing the rotating bracket thereinto in a direction of thickness thereof.

(13) Preferably, the angular position adjusting apparatus further includes a backlash adjusting mechanism, which is provided around the shaft between the fixed bracket and the rotating bracket, for pushing the internal gear and the external gear in a direction in which the internal gear and the external gear mesh with each other.

(14) Preferably, the angular position adjusting apparatus further includes a collar portion formed around a center axis of the internal gear and around the shaft in the fixed bracket, and a bore surface portion provided around a center axis of the external gear and around the collar portion in the rotating bracket. The backlash mechanism is configured by comprising a wedge member disposed between the collar portion and the bore surface portion, and a spring member for pushing the wedge member so that the wedge member is pushed against the collar portion and the bore surface portion.

(15) Preferably, the angular position adjusting apparatus further includes a first holding bracket, which is mounted on the fixed bracket and adapted to cooperate with the fixed bracket to sandwich the rotating bracket in an axial direction of the shaft, and a second holding bracket, which is mounted on the rotating bracket and adapted to cooperate with the rotating bracket to sandwich the fixed bracket in the axial direction of the shaft. The internal gear and the external gear is mesh-engaged with each other.

(16) Preferably, a fixed member to which the fixed bracket is supported is a seat cushion of a vehicular seat. A movable member to which the rotating bracket is supported is a seat back of the vehicular seat. An angle of inclination of the seat back to the seat cushion is adjusted by adjusting an angular position of the rotating bracket with respect to the fixed bracket.

(17) Preferably, the fixed member is a seat cushion of a vehicular seat. The movable member is a link mechanism connected to a seat slide of the vehicular seat. A height position of the seat cushion with respect to the seat slide is adjusted by adjusting an angular position of the rotating bracket with respect to the fixed bracket.

According to the configuration of (1), the following advantages are obtained. That is, because the tooth profiles are formed according to the trochoid curve, a large contact ratio is obtained in a meshing range in which the internal gear and the external gear mesh with each other. Moreover, the loop shapes are used, so that the inclination of the tooth flat at the meshing point, at which the gears abut against each other, can be set to be smaller than that of a surface perpendicular to the direction of rotation of the external gear. Thus, the strength of teeth can be increased.

According to the configuration of (2), (3), (5), (7), (8), and (10), a press working die for forming the tooth profiles of the internal gear and the external gear, to which the trochoid curves are applied, can be made with high precision by using a numerically controlled machine tool. Consequently, the tooth profiles of the gears can be formed with good accuracy. Also, the strength needed in designing the tooth profiles can easily be ensured.

According to the configuration of (4), (6), and (9), a gap is formed between each top land of the external gear and the associated bottom land of the internal gear and serves as a space, in which lubricating grease is accumulated. Thus, the securement of the durability of the gears is facilitated.

According to the configuration of (12), reduction in the number of components is enabled.

According to the configuration of (13) and (14), in a state in which the angular position is held, backlash is set to be small. Alternatively, when the angular position is adjusted, the adjustment thereof is performed so that backlash is set to be large. Thus, in a state in which the angular position is held, the meshing strength of the gears is set to be high. When the angular position is adjusted, the gears mesh and rotate with a light load to thereby enable an adjusting operation.

BEST MODE FOR CARRYING OUT THE INVENTION

Hereinafter, an angular position adjusting mechanism 5, which is a first embodiment of the invention, is described with reference to FIGS. 1-4, and 6.

Figure 6:
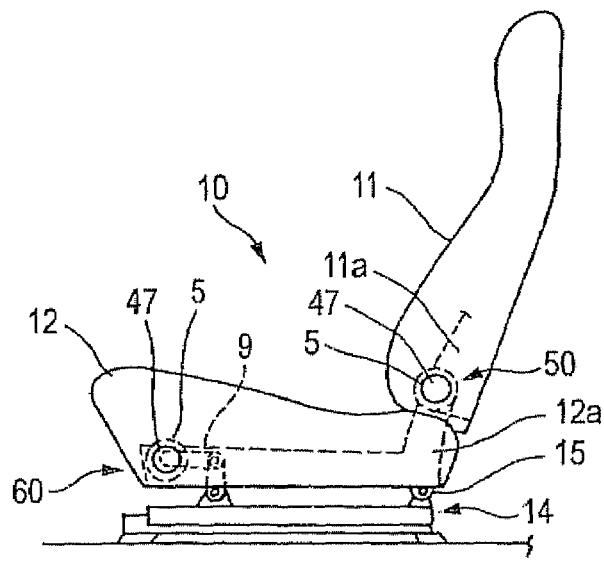
FIG. 6 is a side view illustrating a case where the angular position adjusting mechanism is applied to an apparatus for adjusting the reclining angle of the seat back of a seat and to an apparatus for adjusting the height of a cushion thereof.
Figure 7:
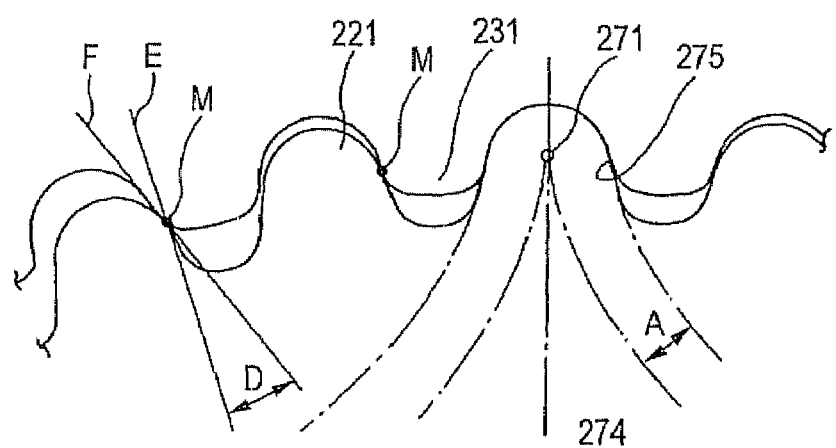
FIG. 7 is a view illustrating tooth profiles according to a cycloid curve used in a prior art angular position adjusting mechanism.

Referring to FIG. 6, the angular position adjusting mechanism 5 is applicable to, for example, a reclining apparatus 50 for adjusting a reclining angle of a seat back 11 of a vehicular seat 10, or to a vertical apparatus 60 for adjusting a height of a seat cushion 12 thereof. That is, the reclining apparatus 50 is configured so that the angular position adjusting mechanism 5 is mounted between a frame 11a of the seat back 11 and a frame 12a of the seat cushion 12, and that an angle of inclination of the seat back 11 can arbitrarily be adjusted by rotating an operating handle 47. When the operating handle 47 is not operated, predetermined strength is ensured so as to hold the position of the seat back 11. Thus, an occupant can be supported. Similarly, the vertical apparatus 60 is configured so that the angular position adjusting mechanism 5 is mounted in a front end portion of the frame 12a of the seat cushion 12 and connected to a seat slide 14 through a link mechanism 9, that further, the seat cushion 12 is rotated around a pivot shaft 15, which connects a rear end portion of the frame 12a to the seat slide 14, by turning the operating handle 47, and that thus, the height of the seat cushion 12 can arbitrarily be adjusted. Similarly, in this case, when the operating handle 47 is not operated, the weight of the occupant is supported and the height thereof is held. Thus, the angular position adjusting mechanism 5 has a function of firmly holding the position in addition to a position adjusting function.

Figure 1:
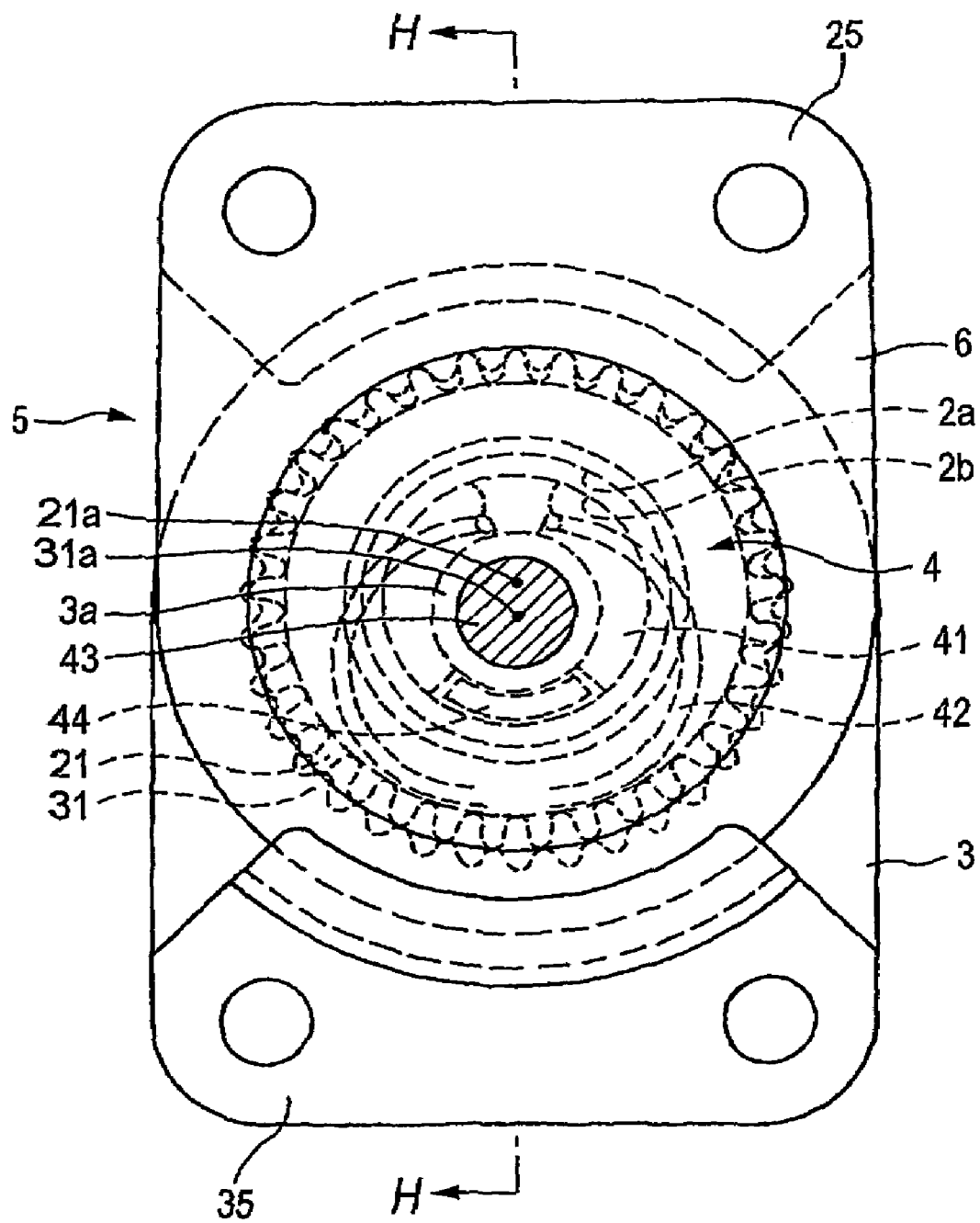
FIG. 1 is a plan view illustrating an angular position adjusting mechanism according to a first embodiment.
Figure 2:
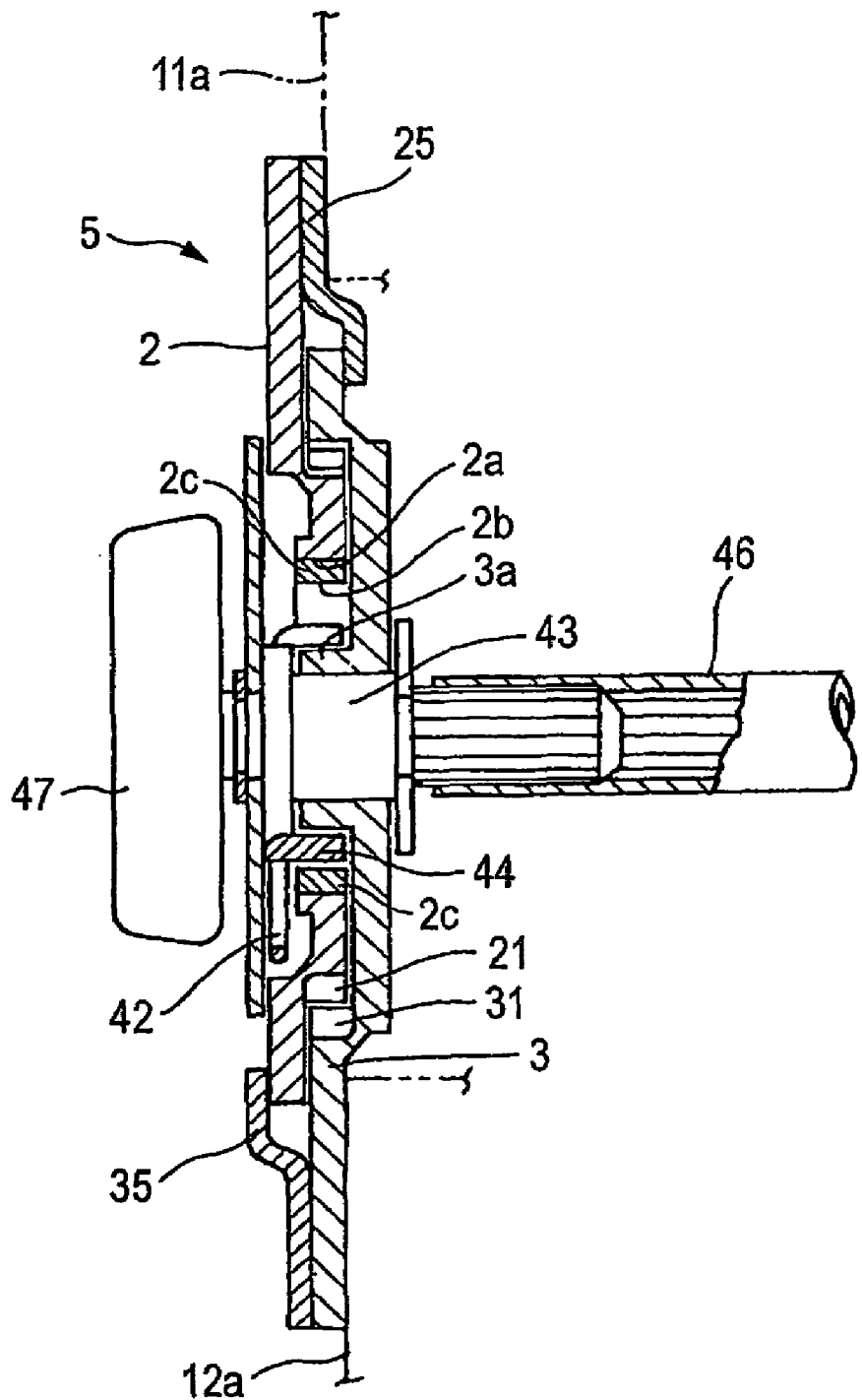
FIG. 2 is a cross-sectional view taken on H-H line shown in FIG. 1.

Next, the configuration of the angular position adjusting mechanism 5 is described with reference to FIGS. 1 and 2.

The basic configuration of the angular position adjusting mechanism 5 according to the embodiment is similar to a known adjusting mechanism configured by combining an internal gear and an external gear, which are eccentric from each other. That is, the angular position adjusting mechanism 5 has a fixed plug 3, which is fixedly mounted on the frame 12a (fixed member) of the seat cushion 12, and a rotating bracket 2, which is rotatably supported by this fixed bracket 3 and fixedly mounted on the frame 11a (movable member) of the seat back 11, in the example of application thereof to the seat reclining apparatus 50. An internal gear 31 is formed in the fixed bracket 3, while an external gear 21 is formed in the rotating bracket 2. The number of teeth of the external gear 21 is set to be smaller than that of teeth of the internal gear 31 by at least one. Incidentally, in the embodiment shown in FIG. 1, that of teeth of the internal gear 31 is set at 34, while that of teeth of the external gear 21 is set at 33. The external gear 21 is formed by using what is called a half-die-cutting method of pressing the rotating bracket 2 thereinto in the direction of thickness thereof by about half or about one-third the thickness thereof by press-working. The external gear 21 is thus formed in an outside diameter part of a convex portion formed on the rotating bracket 2, which is formed by this half-die-cutting method. The internal gear 31 is formed by using what is called a half-die-cutting method of pressing the fixed bracket 3 thereinto in the direction of thickness thereof by about half to about two-thirds the thickness thereof by press-working. The internal gear 31 is thus formed in an inside-diameter part of a concave portion formed on the fixed bracket 3, which is formed by this half-die-cutting method. Incidentally, the mechanism may be formed so that the external gear 21 is formed in the fixed bracket 3, and that the internal gear 31 is formed in the rotating bracket 2.

A cylindrical collar part 3a is formed in a central portion of the internal gear 31 along the central axis 31a thereof in such a way as to protrude therefrom. A shaft 43 is disposed in the bore of the collar portion 3a in such a manner as to penetrate therethrough. An interlocking member 46 for interlocking the shaft 46 with an angular position adjusting mechanism (not shown) mounted on an opposite side surface of the vehicular seat 10 is connected to the shaft 43.

A first holding bracket 35 is mounted on the bottom part (shown in a lower part of FIG. 2) of the fixed bracket 3. A second holding bracket 25 is mounted on the top part (shown in an upper part of FIG. 2) of the rotating bracket 2. The top part (shown in the upper part of FIG. 2) of the fixed bracket 3 is sandwiched by the rotating bracket 2 and the second holding bracket in an axial direction of the shaft 43. The bottom part (shown in the lower part of FIG. 2) of the rotating bracket 2 is sandwiched by the fixed bracket 3 and the first holding bracket 35 in the axial direction of the shaft 43. Consequently, the rotating bracket 2 and the fixed bracket 3 are combined with each other so that the external gear 21 is mesh-engaged with the internal gear 31 while the angular position of the rotating bracket 2 with respect to the fixed bracket 3 can be adjusted.

The collar portion 3a of the fixed bracket 3 and a hole 2a, through which the shaft 43 penetrates, are formed in the central portion of the external gear 21 formed in the rotating bracket 2. A bearing member 2c having a bore surface portion 2b is mounted by being press-fitted into the bore of the hole 2a. The bore surface portion 2b is concentric with the center of 21a of the external gear 21. The diameter of the bore surface portion 2b is set to be larger than the outside diameter of the collar portion 3a.

Next, a backlash adjusting mechanism 4 to be disposed between the internal gear 31 and the external gear 21 is described.

The backlash adjusting mechanism 4 has paired wedge members 41 and a spring member 42, which are disposed in the gap between the bore surface portion 2b and the collar portion 3b. The wedge 41 is shaped so that the thickness of an upper part thereof is larger than the thickness of a lower part thereof, and the thickness thereof decreases towards the bottom thereof from the top thereof in a state, as viewed in FIG. 1. The paired wedge members 41 are disposed on the outside diameter of the collar portion 3a in such a way as to be spaced apart from each other at the top and the bottom thereof, as shown in FIG. 1. The spring member 42 is mounted in such a manner as to apply an action force in a direction, in which the distance between the tops of the paired wedge members 41, so as to push the wedge members 41 so that each of the wedge members 41 is pressed against the collar portion 3a and the bore surface portion 2b. This mechanism is configured so that the action force of the spring member 42 acts, as shown in FIG. 1, that the wedge members 41 are thus pushed against the collar portion 3a and the bore surface portion 2b, and that consequently, the wedge members 41 orbit around the collar portion 3a to the downward side thereof to thereby raise the bore surface portion 2b upwardly, as viewed in FIG. 1, with respect to the collar portion 3a. Thus, the bore surface portion 2b is upwardly raised, so that an amount of eccentricity of the center 21a of the external gear 21 with respect to the center 31a of the internal gear 31 increases. This mechanism is configured so that the external gear 21 and the internal gear 31 are pushed against each other in such a way as to eliminate the gap between the teeth of the external gear 21 and those of the internal gear 31, that is, eliminate backlash.

The backlash mechanism 4 has a pawl portion 44, which is spaced apart from the center of rotation of the shaft 43 and integrally formed therewith. An end part of the pawl portion 44 extends in parallel with a center axis of rotation of the shaft 43 and is inserted between the bottoms of the paired wedge members 41. The shaft 43 extends so that an end portion thereof projects toward a lateral side of the angular position adjusting mechanism 5, and that the operating handle 47 is fixedly attached to an end thereof.

The operating handle 47 is operated in such a way as to rotate, so that the pawl portion 44 abuts against the bottom portion of one of the wedge members 41. When the wedge members 41 are raised against the action force of the spring member 42, the distance between the center 21a of the external gear 21 and the center 31a of the internal gear 31 decreases. Consequently, the mesh between both the gears is loosened, so that the backlash increases. The increase of the backlash enables the rotation of both the gears with small meshing resistance thereof.

When an operation of turning the operating handle 47 is continued, the center 21a of the external gear 21 moves around the center 31a of the internal gear 31. The positions of the paired wedge members 41 are turned from those shown in FIG. 1. Thus, the meshing positions, at which the teeth of the external gear 21 and the internal gear 31 mesh with each other, are turned in sequence. One revolution of the operating handle 47 causes the position of the rotating bracket 2 to turn with respect to the fixed bracket 3 by an angle corresponding to an angular pitch of teeth of the gear. Consequently, the mechanism is enabled to adjust the angular position between the fixed bracket 3 and the rotating bracket 2.

Next, the tooth profiles of the internal gear 31 and the external gear 21 provided in the angular position adjusting mechanism 5, which are formed by employing the trochoid curve, are described with reference to FIGS. 3 and 4.

Figure 3:
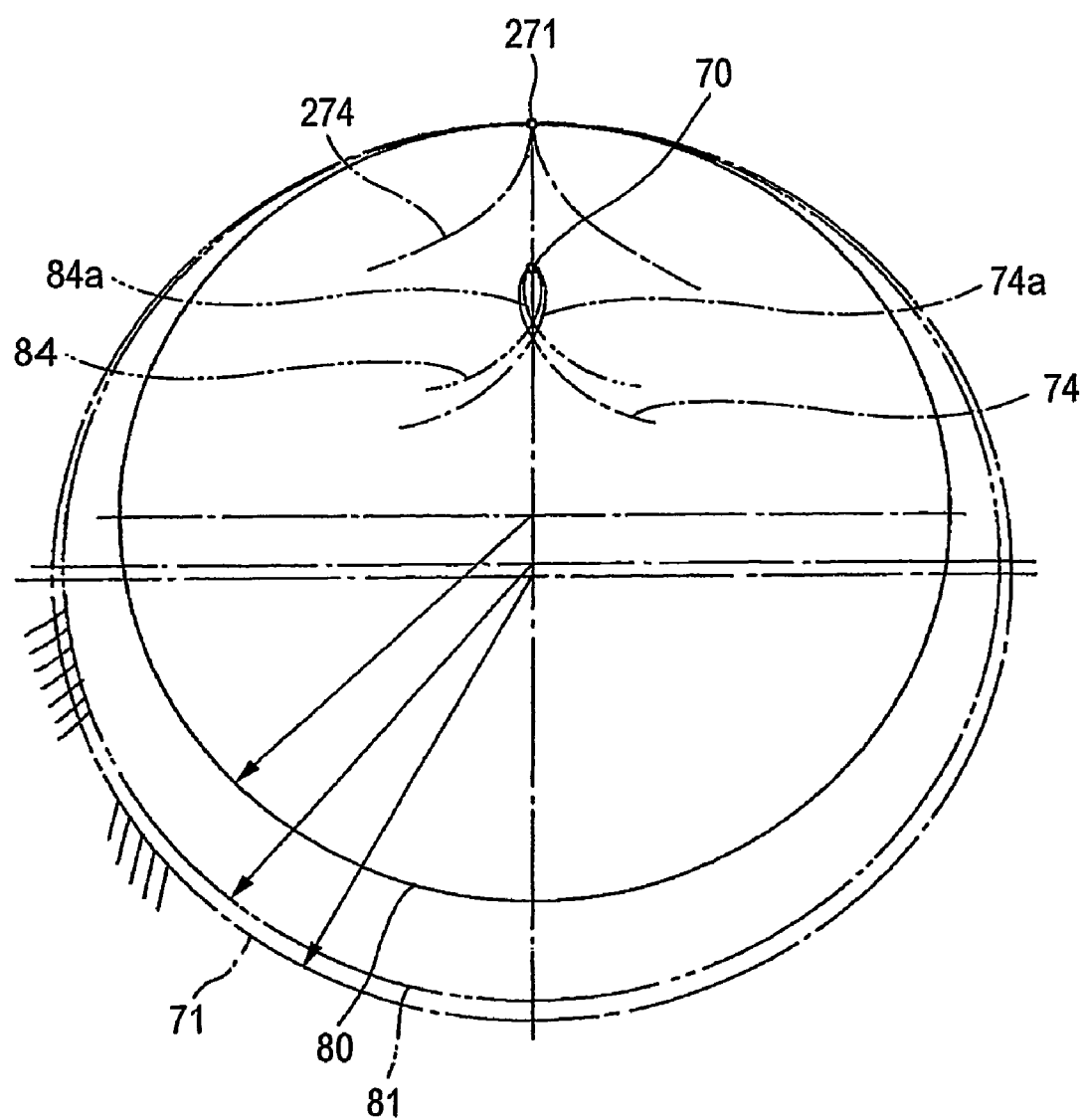
FIG. 3 is an explanatory view illustrating trochoid curves and cycloid curves.

As shown in FIG. 3, a rolling circle 80, which internally touches a first fixed circle 71 in such a way as to roll therealong, is set. When a basic point 70 is set in the rolling circle 80, the locus of the basic point 70 is a first trochoid curve 74. The first trochoid 74 has a loop shape 74a. When the rolling circle 80 internally touches and rolls along a second fixed circle 81 set in such a manner as to internally touch the first fixed circle 71, the locus of the basic point 70 is a trochoid curve 84, which similarly has a loop shape 84a.

Figure 4:
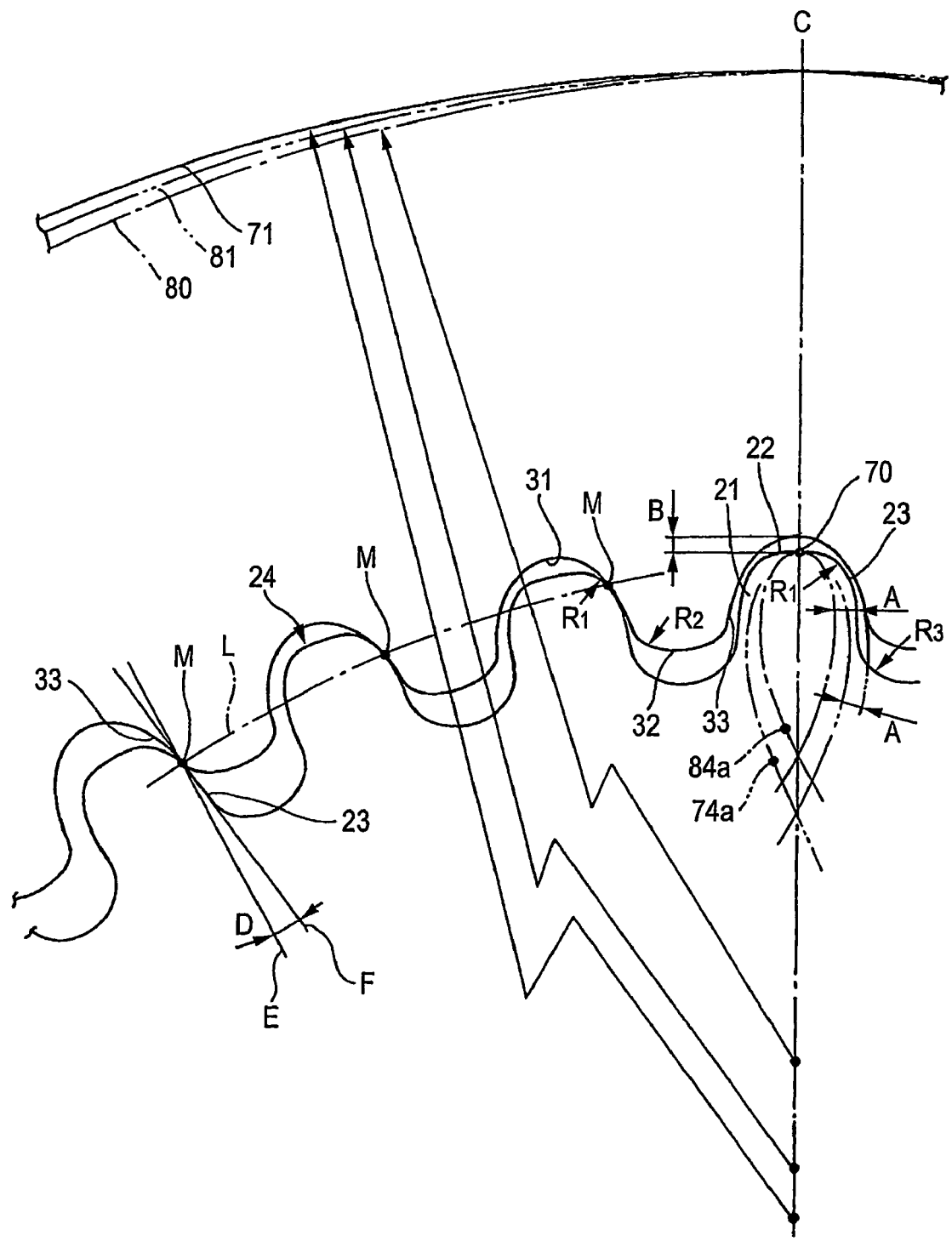
FIG. 4 is an enlarged view illustrating tooth profiles according to trochoid curves to which the angular position adjusting mechanism is applied.

As shown in FIG. 4, the tooth profiles of the internal gear 31 and the external gear 21 are formed according to the loop shapes 74a and 84a, respectively. That is, the tooth flank of the internal gear 31 is set at a constant distance A from the loop shape 74a, and that of the internal gear 21 is set at a constant distance A from the loop shape 84a. The internal gear 31 and the external gear 21 mesh with each other so that the tooth flanks thereof formed in this manner abut against each other at plural meshing points M. A meshing line connecting the meshing points M extends by bending almost along the direction of an inner circumference of the internal gear 31 and along the direction of an outer circumference of the external gear 21. Consequently, a larger number of meshing points M can be obtained, as compared with the case of ordinary internal and external gears having tooth profiles constituted by, for instance, involute curves, in which the meshing line is a straight line. Thus, a contact ratio obtained by averaging the number of the meshing points occurring at each revolution increases. Consequently, higher strength mesh between the gears can be realized.

The external gear 21 is provided with top lands 22 each obtained by eliminating a part of an associated end portion of a shape, which is formed of points positioned at a constant distance A from the loop shape 84a, so that the distance from the top of the associated end portion to the base of the eliminated part is B and that the top of the rest of the associated end portion is flat. By employing this profile, even at a top dead center position (the position shown in a right-hand side part of FIG. 4) C, at which the external gear 21 most deeply meshes with the internal gear 31, the gap is maintained between the internal gear 31 and each of the top lands 22 of the external gear 21. Grease serving as a lubricant is accumulated in the gap. Thus, the mechanism is configured so that a smooth operation and durability are ensured. Incidentally, the mechanism may be configured so that the gap between the external gear 21 and each of top lands of the internal gear 31 is maintained by setting the shape of each of the top lands of the internal gear 31 to be flat.

As shown in FIG. 4, the teeth of the external gear 21 is set in such a way as to have a predetermined tooth height. A curved surface R1 is applied to a corner portion serving as a boundary between the top land 22 and a side surface 23 of each of the teeth. Another curved surface R3 is applied to a bottom land thereof. On the other hand, another curved surface R3 is provided as a corner portion of a top land 32 of the internal gear 31. Thus, the internal gear 31 is shaped so that the teeth of the internal gear 31 and the external gear 21 do not cause interference when the internal gear 31 and the external gear 21 mesh with each other and rotate. The shape of each of the curved surfaces R1, R2, and R3 are needed for a press die used in the half-die-cutting method employing press-working. The durability of the press die is ensured by setting these curved surfaces R1, R2, and R3. The external gear 21 is provided with a tooth flank portion (a relief flank portion) 24, which differs from a trochoid curve similarly to the curved surfaces R1 and R2 of the tooth profile and the top land 22 but formed in such a way as to relieve a load from the side surfaces 23 and 33, which relate to the abutment of the teeth, to a side, on which the teeth do not abut against each other. Thus, the external gear 21 is set so that at the position C (FIG. 4) of the upper dead center of the meshing gears, no abutment of the gears against each other occurs. Thus, the meshing points M are disposed by being dispersed on both lateral sides of the position of the upper dead center C. In the case of employing the gears formed in such a way as to have such configurations, the load is dispersed to many gears at the plural meshing points M without being concentrated onto the teeth at the position of the upper dead center C, even when shape errors occur in the tooth profile. Incidentally, the mechanism may be configured so that the curved surface R3 is applied to the bottom land of each of the teeth of the external gear 21, and that the internal gear 31 has the tooth surface portions 24.

The gears, whose tooth profiles are formed according to the loop shapes 74a and 84a, are adapted so that the closer to the bottom land of each of the teeth of the external gear 21 and the closer to the top land of each of the teeth of the internal gear 31, the closer toward the radial direction the side surface 23 of the external gear and the side surface 33 of the internal gear are bent. Thus, as shown in a left-side part of FIG. 4, at a position distant from the position of the upper dead center C, the inclination D of the tooth flank F of each of the external gear 21 and the internal gear 31 to a surface E perpendicular to the direction of rotation of the external gear is small at the meshing point M. Thus, the mechanism is configured so that the securement of the strength against the load applied in the direction of rotation thereof is more facilitated.

Although the tooth flanks are set on the tooth profiles of the internal gear 31 and the external gear 21, which are formed of points positioned at the constant distance A from the loop shapes 74a and 84a in the aforementioned embodiment, the tooth flanks may be set at positions laterally turned from the direction of rotation of each of the internal gear 31 and the external gear 21 by a predetermined angle with respect to the loop shapes 74a and 84a, respectively.

As described above, the internal gear 31 and the external gear 21 are formed in the rotating bracket 2 and the fixed bracket 3 by the half-die-cutting method using press-forming or the like. However, a forming die can be made with good precision by applying a trochoid curve, which is strictly defined by a theoretical expression, and by using a numerically controlled machine tool. The strength of teeth of the gears can accurately and easily be set according to an intended use by such a theoretical expression.

Figure 5:
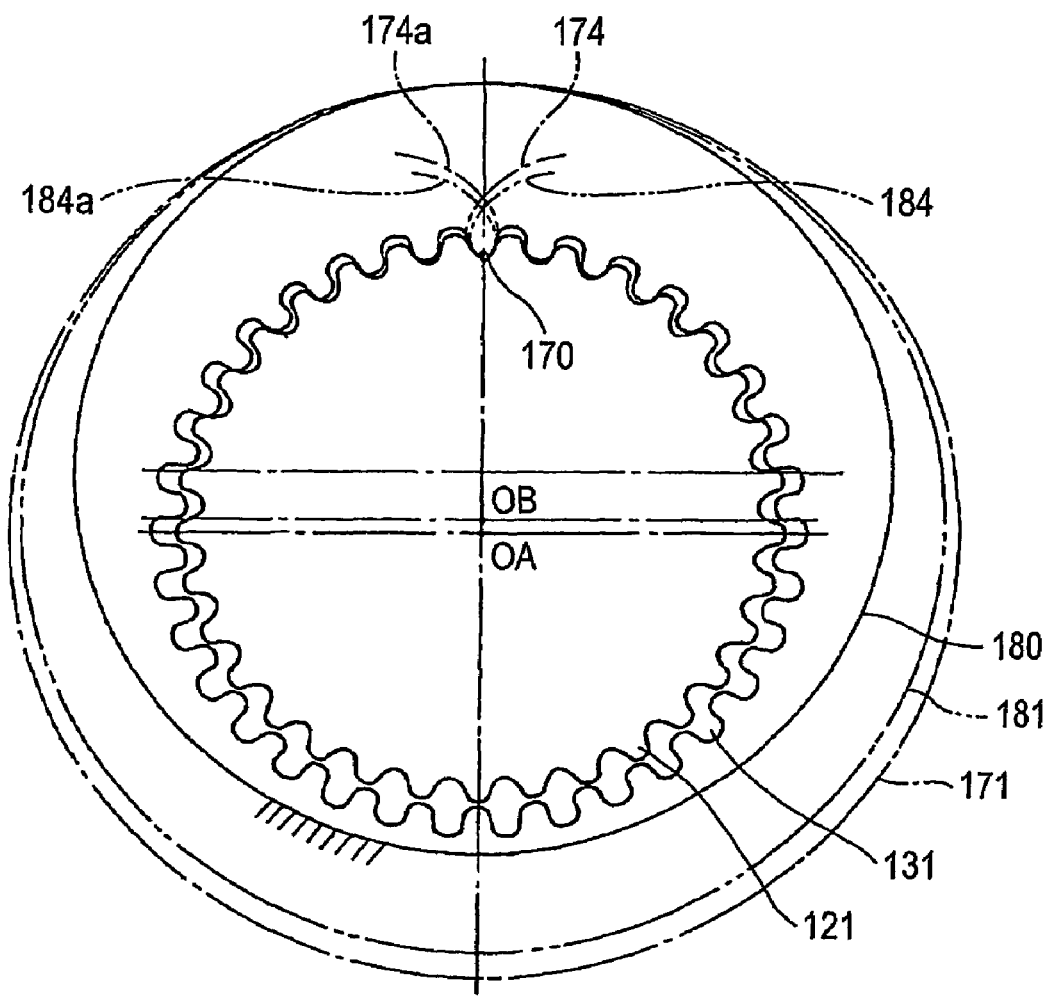
FIG. 5 is an enlarged view illustrating tooth profiles according to trochoid curves to which an angular position adjusting mechanism according to a second embodiment is applied.

Referring to FIG. 5, there is shown a tooth profile according to a second embodiment, which is employable in the angular position adjusting mechanism 5 according to the invention. In the embodiment shown in FIG. 5, a circle having a smallest diameter is set to be a fixed circle 180. This embodiment is adapted so that the inner circumferences of rolling circles 171 and 181 internally touch the outer circumference of the fixed circle 180. Trochoid curves 174 and 184, which are drawn by moving the basic point 170 when the rolling circles 171 and 181 are rolled, are obtained. In this case, loops are formed in an orientation opposite to the orientation, in which the loop shapes 74a and 84a of the first embodiment are looped, in the direction of a diameter of each of the fixed circle and the rolling circle. An external gear 121 and an internal gear 131, which respectively have tooth profiles obtained according to the trochoid curves 174 and 184, can operate similarly to the external gear and the internal gear of the first embodiment by being applied to the angular position adjusting mechanism 5.

The invention claimed is:

1. An angular position adjusting apparatus comprising:
a fixed bracket supported by a fixed member;
a rotating bracket supported by a movable member and enabled to adjust a relative angular position thereof with respect to the fixed bracket;
an internal gear formed in one of the fixed bracket and the rotating bracket; and
an external gear formed in the other of the fixed bracket and the rotating bracket,
wherein the internal gear is mesh-engaged with the external gear to thereby enable a central axis of the external gear to orbit around a central axis of the internal gear,
wherein tooth profiles of the internal gear and the external gear are formed according to loop shapes of predetermined trochoid curves, and
wherein the tooth profiles of the internal gear and the external gear are formed so that tooth flanks of each of the internal gear and the external pear are formed to be at a constant distance from an associated one of the loop shapes.

2. The angular position adjusting apparatus according to claim 1, wherein the tooth profiles of the internal gear and the external gear are formed so that tooth flanks of each of the internal gear and the external gear are distanced in a direction of rotation of a constant angle from an associated one of the loop shapes.

3. The angular position adjusting apparatus according to claim 1, wherein at least one of the tooth profiles of the internal gear and the external gear has a relief flank portion that differs from the loop shapes of the predetermined trochoid curves, and wherein a gap is formed between each bottom land of the internal gear and an associated top land of the external gear in a state in which the internal gear meshes with the external gear.

4. The angular position adjusting apparatus according to claim 1, wherein the tooth profile of the external gear is formed so that tooth flanks are formed according to the loop shapes of the predetermined trochoid curve, top lands are formed to have flat shapes, and a curved surface is applied to a corner portion serving as a boundary between each of the tooth flanks and an associated one of the top lands thereof.

5. The angular position adjusting apparatus according to claim 4, wherein a relief flank portion for forming a gap between each of bottom lands of the internal gear and an associated one of the top lands, is formed of an associated one of the top lands and an associated one of the corner portions.

6. The angular position adjusting apparatus according to claim 4, wherein the tooth profile of the external gear is formed so that each of bottom lands is formed of a curved surface.

7. The angular position adjusting apparatus according to claim 1, wherein the tooth profile of the internal gear is formed so that the tooth flanks are formed according to the loop shapes of the predetermined trochoid curve, top lands are formed to have flat shapes, and a curved surface is applied to a corner portion serving as a boundary between each of the tooth flanks and an associated one of the top lands thereof.

8. The angular position adjusting apparatus according to claim 7, wherein a relief flank portion for forming a gap between each of bottom lands of the external gear and an associated one of the top lands, is formed of an associated one of the top lands and an associated one of the corner portions.

9. The angular position adjusting apparatus according to claim 7, wherein the tooth profile of the internal gear is formed so that each of bottom lands is formed of a curved surface.

10. The angular position adjusting apparatus according to claim 1, further comprising a shaft rotatably supported by the fixed bracket, wherein the internal gear is formed around the shaft and in the fixed bracket, wherein the external gear is formed around the shaft and in the rotating bracket, and wherein the number of teeth of the external gear is smaller than that of teeth of the internal gear by at least one.

11. The angular position adjusting apparatus according to claim 10, wherein the internal gear is formed in a bore part of a concave portion formed by pushing the fixed bracket thereinto in a direction of thickness thereof, and wherein the external gear is formed in an outside diameter part of a convex portion formed by pushing the rotating bracket thereinto in a direction of thickness thereof.

12. The angular position adjusting apparatus according to claim 10, further comprising a backlash adjusting mechanism that is provided around the shaft between the fixed bracket and the rotating bracket, and pushes the internal gear and the external gear in a direction in which the internal gear and the external gear mesh with each other.

13. The angular position adjusting apparatus according to claim 12, further comprising:

a collar portion formed around a center axis of the internal gear and around the shaft in the fixed bracket; and a bore surface portion provided around a center axis of the external gear and around the collar portion in the rotating bracket, wherein the backlash mechanism includes:

a wedge member disposed between the collar portion and the bore surface portion; and a spring member for pushing the wedge member so that the wedge member is pushed against the collar portion and the bore surface portion.

14. The angular position adjusting apparatus according to claim 10, further comprising:

a first holding bracket mounted on the fixed bracket and cooperatively moves with the fixed bracket to sandwich the rotating bracket in an axial direction of the shaft; and a second holding bracket mounted on said rotating bracket and cooperatively moves with the rotating bracket to sandwich the fixed bracket in the axial direction of the shaft, wherein the internal gear and the external gear is mesh-engaged with each other.

15. The angular position adjusting apparatus according to claim 1, wherein the fixed member includes a seat cushion of a vehicular seat, wherein the movable member includes a seat back of the vehicular seat, and wherein an angle of inclination of the seat back to the seat cushion is adjusted by adjusting an angular position of the rotating bracket with respect to the fixed bracket.

16. The angular position adjusting apparatus according to claim 1, wherein the fixed member includes a seat cushion of a vehicular seat, wherein the movable member includes a link mechanism connected to a seat slide of the vehicular seat, and wherein a height position of the seat cushion with respect to the seat slide is adjusted by adjusting an angular position of the rotating bracket with respect to the fixed bracket.

17. An angular position adjusting apparatus comprising:

a fixed bracket supported by a fixed member;

a rotating bracket supported by a movable member and enabled to adjust a relative angular position thereof with respect to the fixed bracket;

an internal gear formed in one of the fixed bracket and the rotating bracket; and an external gear formed in the other of the fixed bracket and the rotating bracket, wherein the internal gear is mesh-engaged with the external gear to thereby enable a central axis of the external gear to orbit around a central axis of the internal gear, wherein tooth profiles of the internal gear and the external gear are formed according to loop shapes of predetermined trochoid curves, wherein the loop shape of the predetermined trochoid curve of the internal gear is obtained based on a first trochoid curve as a locus of a basic point set in a rolling circle, which internally touches and rolls along a first fixed circle, and wherein the loop shape of the predetermined trochoid curve of the external gear is obtained based on a second trochoid curve as a locus of the basic point when the rolling circle internally touches and rolls along a second fixed circle set so as to internally touch the first fixed circle.

18. The angular position adjusting apparatus according to claim 17,
wherein a tooth flank of the internal gear is set at a constant distance from the loop shape of the first trochoid curve, and
wherein a tooth flank of the external gear is set at the constant distance from the loop shape of the second trochoid curve.

19. An angular position adjusting apparatus comprising:
a fixed bracket supported by a fixed member;
a rotating bracket supported by a movable member and enabled to adjust a relative angular position thereof with respect to the fixed bracket; and
an internal gear formed in one of the fixed bracket and the rotating bracket; and
an external gear formed in the other of the fixed bracket and the rotating bracket,
wherein the internal pear is mesh-engaged with the external gear to thereby enable a central axis of the external gear to orbit around a central axis of the internal gear,
wherein tooth profiles of the internal gear and the external gear are formed according to loop shapes of predetermined trochoid curves, and
wherein the loop shape of the predetermined trochoid curve of the internal gear is different from the loop shape of the predetermined trochoid curve of the external gear.

* * * * *

UNITED STATES PATENT AND TRADEMARK OFFICE
CERTIFICATE OF CORRECTION

PATENT NO.       : 7,611,436 B2                                                      Page 1 of 1
APPLICATION NO.  : 10/571259
DATED            : November 3, 2009
INVENTOR(S)      : Sadao Ito It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Twelfth Day of October, 2010

David J. Kappos
*Director of the United States Patent and Trademark Office*